(12) United States Patent
Chang et al.

(10) Patent No.: US 12,271,811 B2
(45) Date of Patent: Apr. 8, 2025

(54) SYSTEMS AND METHODS FOR EMAIL CAMPAIGN DOMAIN CLASSIFICATION

(71) Applicant: Proofpoint, Inc., Sunnyvale, CA (US)

(72) Inventors: Hung-Jen Chang, Fremont, CA (US); Gaurav Mitesh Dalal, Fremont, CA (US); Ali Mesdaq, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 999 days.

(21) Appl. No.: 17/217,903

(22) Filed: Mar. 30, 2021

(65) Prior Publication Data

US 2021/0374526 A1    Dec. 2, 2021

Related U.S. Application Data

(60) Provisional application No. 63/030,089, filed on May 26, 2020.

(51) Int. Cl.
| | |
|---|---|
| *H04L 9/40* | (2022.01) |
| *G06F 16/28* | (2019.01) |
| *G06N 3/04* | (2023.01) |
| *G06N 3/08* | (2023.01) |

(52) U.S. Cl.
CPC ............. *G06N 3/08* (2013.01); *G06F 16/285* (2019.01); *G06N 3/04* (2013.01)

(58) Field of Classification Search
CPC .......... G06N 3/08; G06N 3/04; G06F 16/285; H04L 61/4511; H04L 63/1483
See application file for complete search history.

(56) References Cited

U.S. PATENT DOCUMENTS

| | | | |
|---|---|---|---|
| 2014/0033307 A1 | 1/2014 | Schmidtler | |
| 2014/0298460 A1 | 10/2014 | Xue et al. | |
| 2021/0044554 A1* | 2/2021 | Toper | .................... H04L 51/212 |
| 2023/0224327 A1* | 7/2023 | Haworth | ............. H04L 63/1441 |
| | | | 726/23 |

FOREIGN PATENT DOCUMENTS

WO    WO-2020132137 A1 *    6/2020    ........... G06F 21/561

OTHER PUBLICATIONS

European Search Report issued for European Patent Application No. 21169758.6, mailed Jun. 21, 2021, 9 pages.

* cited by examiner

*Primary Examiner* — Hassan Mrabi
(74) *Attorney, Agent, or Firm* — Sprinkle IP Law Group

(57) ABSTRACT

A domain processing system receives or collects raw data containing sample domains each having a known class identity indicating whether a domain is conducting an email campaign. The domain processing system extracts features from each of the sample domains and selects features of interest from the features, including at least a feature particular to a seed domain and features particular to email activities over a time line that includes days before and after a domain creation date. The features of interest are used to create feature vectors which, in turn, are used to train a machine learning model, the training including optimizing a neural network structure iteratively until stopping criteria are satisfied. The trained model functions as an email campaign domain classifier operable to classify candidate domains with unknown class identities such that each of the candidate domain is classified as conducting or not conducting an email campaign.

18 Claims, 4 Drawing Sheets

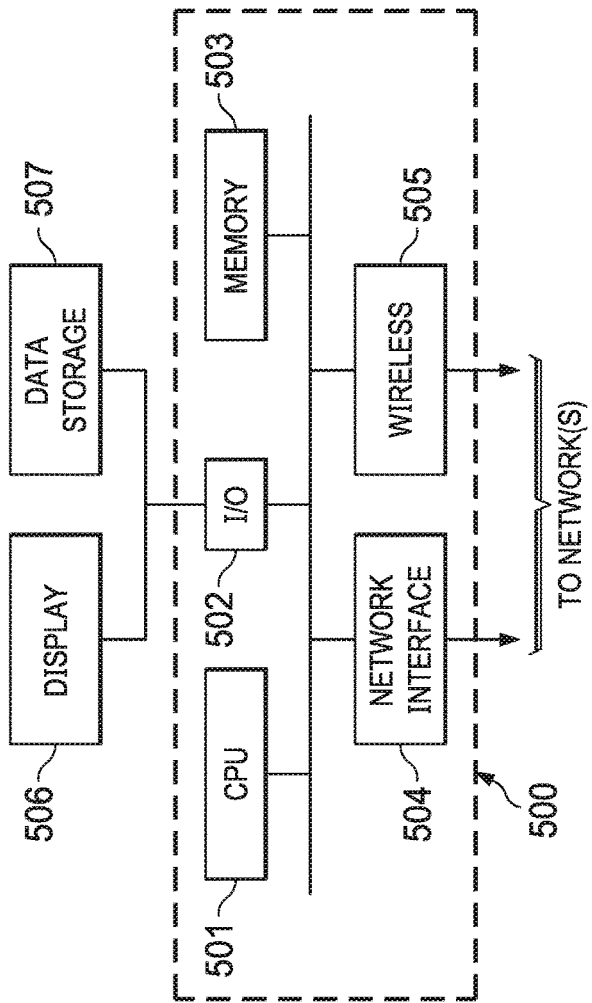

SYSTEMS AND METHODS FOR EMAIL CAMPAIGN DOMAIN CLASSIFICATION

CROSS-REFERENCE TO RELATED APPLICATION(S)

This application claims a benefit of priority under 35 U.S.C. § 119(e) from U.S. Provisional Application No. 63/030,089, filed May 26, 2020, entitled "SYSTEMS AND METHODS FOR CAMPAIGN EMAIL CLASSIFICATION," which is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to the field of digital risk detection. More particularly, this disclosure relates to systems, methods, and computer program products for email campaign domain classification, useful for enhancing domain protection.

BACKGROUND OF THE RELATED ART

Today, there are hundreds of millions of registered domains on the Internet. New domain names are added to this number on a daily basis. In this case, a "domain name" generally refers to an identification string that defines a realm of administrative autonomy, authority, or control within the Internet. Domain names, which are referred to as "domains" herein, may be formed by the rules and procedures of the Domain Name System (DNS), which is known to those skilled in the art as a hierarchical and decentralized naming system for computers, services, or other resources connected to the Internet or a private network.

Domain names are used in various networking contexts and application-specific naming and addressing purposes. In general, a domain name represents a numerical Internet Protocol (IP) resource, such as a computer used to access the Internet, a server computer hosting a web site, or the web site itself or any other service communicated via the Internet. The DNS translates a domain name to a numerical IP address needed for locating and identifying computer services and devices with the underlying network protocols. To this end, organizations may choose a domain name that corresponds to their name (or brand) so that Internet users can reach them easily. In this context, a brand can be a name, trademark, term, design, symbol, or other feature that distinguishes an entity (e.g., organization, product, etc.) from its rivals or competitors in the eyes of others (e.g., consumers).

However, to confuse end users and/or profit from the goodwill of a certain domain, brand, or trademark belonging to someone else, attackers and bad actors alike may try to register domain names that are similar to that certain brand, domain, or trademark. Such spoofed domain names may often contain the name of the brand or a word similar to the brand name. Another tactic that may be used for attacking or otherwise malicious purposes is to include an auxiliary term or terms in a domain so that it appears to be connected to the brand. For example, a spoofed domain for a bank may also include the words "financial" or "investment" in addition to the name of the bank. As another example, a spoofed domain for a brand may include other trademarks of the brand.

Due at least to the massive number of registered domains and the relative ease to spoof legitimate domain names, looking for a spoofed domain from hundreds of millions of domains on the Internet is akin to looking for a needle in a haystack. This means that legitimate domain names, such as those owned by organizations and/or brands, could be spoofed and used for email campaigns and that emails from the spoofed domains would be difficult to detect and/or eliminate. This makes protecting an organization's computer network and its users from unwanted email campaigns extremely difficult, if not nearly impossible. As a result, current email protection tools are often ineffective in preventing unwanted email campaigns. Consequently, there is room for technical innovations and improvements.

SUMMARY OF THE DISCLOSURE

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

An objective of the invention is to provide a new email protection solution that addresses the drawbacks of current email protection tools alluded to above. To this end, embodiments disclosed herein provide systems, methods, and computer program products for email campaign domain classification, useful for identifying whether a particular domain is conducting an email campaign.

In some embodiments of the invention, a method includes receiving and/or collecting, by a computer system, raw data containing domains known as either "campaign" or "not campaign." Domain-associated features can be obtained from these domains. A properly reduced set of features, which summarize most of the information contained in the original large set of features can then be identified by using various feature extraction techniques. For each domain, the features in the reduced feature set can be selected and converted to a corresponding feature vector. Feature vectors for a set of domains are used to train a machine learning model. At stage 1, the total label matching error is defined by an objective function and minimized by way of learning algorithms of a neural network. At stage 2, based on minimizing the false positive rate and maximizing the classification accuracy rate of each intermediate trained model during a verification process, a neural network structure (e.g., a number of layers and a number of neurons per layer) and the feature selection (i.e., a set of features) can be iteratively optimized by way of a local search procedure. When the stopping criteria are satisfied, a domain classification model is built as an email campaign domain classifier.

In practice, the machine learning model thus trained is treated as a base model. An odd number of well-trained base models may be prepared. To reduce variance and avoid overfitting, an ensemble modeling process where the multiple diverse base models are used to predict an outcome, is applied to build a final ensemble classifier.

The email campaign domain classifier thus built can be utilized to classify candidate domains with unknown class identity as "campaign" or "not campaign." Feature vectors for such candidate domains can be created using the same processing methods during the machine learning modeling process. If the feature vector of a domain is classified as "campaign," it indicates that the domain has an email campaign activity in terms of a conditional probability based on the model learning from training samples. If the feature vector of a domain is classified as "not campaign," it indicates that the domain does not have an email campaign activity in terms of a conditional probability based on the model learning from the training samples. If a domain is classified as indeterminate, this indicates that the domain might not have a good enough indicator as "campaign" or "not campaign." In this case, further investigation of the domain and some action may be required.

The email campaign domain classification output from the trained model can be used to update the datasets and/or databases for modeling, once the correct prediction result is verified. The machine learning model training process can be repeated to build an updated model based on the larger set of labeled raw data. Additionally or alternatively, the domain may be reported to a customer through a report and/or an alert.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 depicts a diagrammatic representation of an example of a user interface of a domain processing system according to some embodiments disclosed herein.

FIG. 5 depicts a diagrammatic representation of a data processing system for implementing a domain processing system.

DETAILED DESCRIPTION

Figure 1:
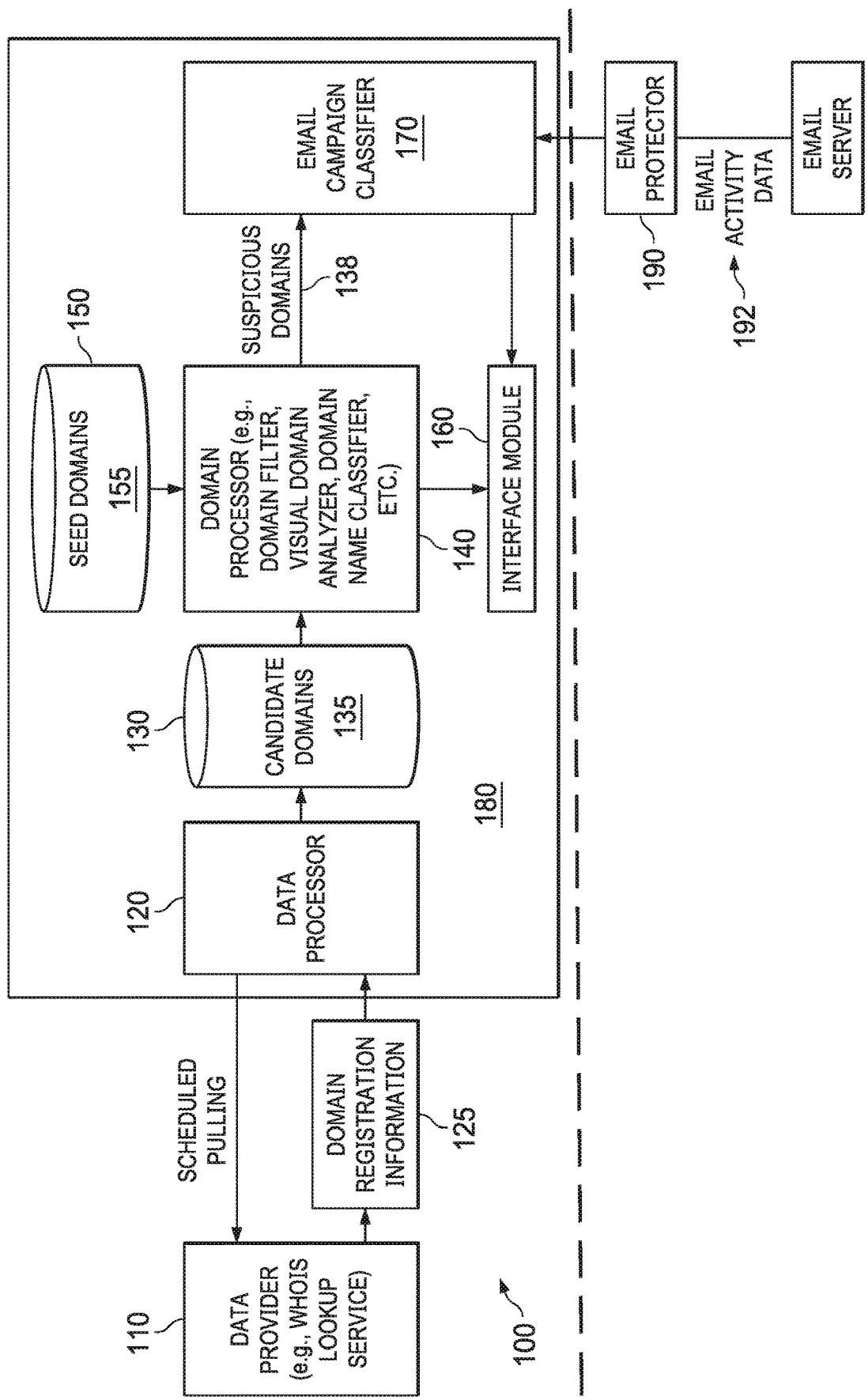
FIG. 1 depicts a diagrammatic representation of an example of a domain processing system according to some embodiments disclosed herein.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In some embodiments, the invention can be implemented as part of a domain name processing system that includes a variety of domain discovery and classification tools. Examples of a domain name processing system are described in U.S. Pat. Nos. 10,785,188, 10,679,088, and 10,673,814, which are issued to Proofpoint, Inc., Sunnyvale, CA, U.S.A., and which are fully incorporated by reference herein.

As alluded above, the number of registered domains on the Internet is massive and that number continues to grow every day. Thus, whenever there is a need to process (e.g., classify, categorized, etc.) domains on the Internet, a huge among of time and resources would be needed to process all of them. For example, suppose a digital risk detection system analyzes over 300 million domains every day, it would be extremely time-consuming and costly (e.g., in terms of computational resources and money) to process every single domain of the 300 million or more domains on a daily basis.

Further complicating the matter is that each of the 300 million or more domains may be processed at least twice, once in a lab or test environment and once in a production environment, bringing the total number of domains under analysis to well over half a billion. Suppose it takes one second for a human to look at the domain and decide how the domain is to be classified, it will take that person more than 15 years to classify all of over half a billion domains.

Using machines can reduce the processing time to a 24-hour period, for example, by using a distance metric such as edit distance or Levenshtein Distance to find similarity in domain names. However, this is a very expensive computation.

Additionally, attempts have been made to generate typosquatting-type domains and use same to detect spoofed domains on the internet. However, these methods are also very expensive in terms of time, computational power, and costs.

Domain filters can help to reduce the number of domains that would need to be processed and, in doing so, can make domain processing more efficient and/or effective. For instance, a domain filter can help to avoid or reduce unnecessary machine computation by eliminating domains that are not relevant to a domain of interest (referred to herein as a "seed domain"). A seed domain can be any domain of interest that is the subject of domain protection (e.g., domain protection from trademark dilution, domain fraud, etc.).

In some embodiments, the invention can leverage the output of a domain filter described in U.S. Pat. No. 10,785,188, in which registered domains found on the Internet (referred to herein as "candidate domains") can be quickly and efficiently filtered down to a significantly smaller set of domains for further analysis against seed domains. Additionally or alternatively, in some embodiments, the invention can leverage the output of a visual domain analyzer, described in U.S. Pat. No. 10,679,088, which is adapted for identifying registered domains that are visually similar to a seed domain. Additionally or alternatively, in some embodiments, the invention can leverage the output of a domain name classifier, described in U.S. Pat. No. 10,673,814, which is adapted for determining, using language models, whether or not particular domain names are relevant to a brand.

As a non-limiting example, FIG. 1 depicts a diagrammatic representation of an example of a domain processing system. In the example of FIG. 1, domain name processing system 180 is communicatively connected to a data provider 110. Data provider 110 may provide a "WHOIS" lookup service in computer network environment 100. WHOIS is a query and response protocol that can be used for querying databases that store the registered users or assignees of an Internet resource, such as a domain name, an IP address block, or an autonomous system.

Domain name processing system 180 may include a data processor 120 that is configured for pulling or requesting data provider 110 on a configurable time interval. In response, data provider 110 may return domain registration information 125 containing key-value pairs, a portion of which is provided below.

```
{"standardRegCreatedDateOriginal": "2017-09-11 00:00:00 UTC",
"technicalContact_email": "", "registrant_telephone": "",
"billingContact_organization": "", "status": "addPeriod",
"whoisServer": "whois.nic.fr", "zoneContact_telephoneExt":
"nameServers": "", "administrativeContact_telephoneExt": "",
"billingContact_email": "", "registrarInfo": "1&1 Internet SE",
"registrant_state": "", "zoneContact_name": "",
"administrativeContact_postalCode": "", "zoneContact_state": "",
"billingContact_country": "", "billingContact_postalCode": "",
"zoneContact_organization": "", "registrant_email": "",
"registrant_rawText": "", "contactEmail": "",
"administrativeContact_country": "FRANCE", "updatedDateOriginal": "",
"technicalContact_telephone": "", "billingContact_telephone": "",
"Audit_auditUpdatedDate": "2017-09-12", "zoneContact_street2": "",
"standardRegUpdatedDateOriginal": "", "billingContact_rawText": "",
"registrarName": "", "zoneContact_telephone": "",
"zoneContact_country": "", "registrant_name": "",
"billingContact_faxExt": "", "registrant_telephoneExt": "",
"standardRegUpdatedDate": "", "technicalContact_street1": "",
"technicalContact_fax": "", "zoneContact_street3": "",
"technicalContact_state": "", "expiresDateOriginal": "11/09/2018",
"technicalContact_postalCode": "", "WhoisRecord_rawText": "",
"registrant_country": "FRANCE", "registrant_faxExt": "",
"zoneContact_faxExt": "", "zoneContact_email": "",
"administrativeContact_email": "", "registrant_city": "",
"billingContact_telephoneExt": "", "RegistryData_rawText": "%%|%% This
is the AFNIC Whois server.|%%|%% complete date format : DD/MM/YYYY|%%
short date format : DD/MM|%% version : FRNIC-2.5|%%|%% Rights
restricted by copyright.|%% See https://www.afnic.fr/en/products-and-
services/services/whois/whois-special-notice/|%%|%% Use '-h' option to
obtain more information about this service.|%%|%% [213.87.240.199
REQUEST] >> startmynet.fr|%%|%% RL Net [##########] - RL IP
[#########.]|%%||domain: domainname.fr|status: ACTIVE ...", ...}
```

In some embodiments, data processor 120 is operable to process domain registration information 125 provided by data provider 110, extract the universal resource locators (URLs), and store the URLs as candidate domains 135 in an Internet domain database 130. In some cases, in addition to URLs, other information, such as the registrant's name, company, email address, etc., may also be extracted from domain registration information 125 and stored in Internet domain database 130.

In some embodiments, data processor 120 can query data provider 110 for all the registered domains on the Internet. In some embodiments, data processor 120 can query data provider 110 for any new domain registered since the last pulling (i.e., getting the delta). Querying data provider 110 can be done based on a configurable time schedule, for example, on a daily basis.

In some embodiments, Internet domain database 130 may implement a relational database system. In some embodiments, Internet domain database 130 may implement an Apache Cassandra™ database available from the Apache Software Foundation.

In some embodiments, domain processor 140 is operable to review candidate domains 135 stored in Internet domain database 130 (e.g., on a configurable time interval such as daily) against one or more seed domains 155 stored in a seed domain database 150. In a non-limiting embodiment, domain processor 140 is operable to review 300 million or more candidate domains stored in Internet domain database 130 on a daily basis against a set of seed domains. In one embodiment, domain processor 140 is operable to review the delta (e.g., about 20,000 URLs) received from data provider 110 on a daily basis against a set of seed domains.

In some embodiments, domain name processing system 180 may operate on a computer operating in an enterprise computing environment or on multiple computers in a distributed computing environment. For example, domain processor 140 may be embodied on a mobile device, a laptop computer, a tablet computer, or any suitable data processing system, while data processor 120, Internet domain database 130, interface module 160, seed domain database 150, and downstream computing facility 170 may be embodied on the same or different computers separate from domain processor 140. In such a distributed computing environment, seed domain database 150 may reside on a server machine. In such a case, domain processor 140 may obtain a seed domain 155 from seed domain database 150 over a secure network connection (e.g., over a private network).

Domain processor 140 may implement a variety of domain name processing functions, including, but are not limited to, a domain filter (e.g., U.S. Pat. No. 10,785,188), a visual domain name analyzer (e.g., U.S. Pat. No. 10,679,088), a domain name classifier (e.g., U.S. Pat. No. 10,673,814), etc. For example, for each seed domain 155, domain processor 140 as a domain filter is operable to provide a significantly smaller number of candidate domains 138 that might be considered as similar or close to the respective seed domain. These can be referred to as "suspicious domains."

In the example of FIG. 1, such suspicious domains are provided to, or obtained by, a downstream computing facility referred to herein as email campaign classifier 170. In some embodiments, email campaign classifier 170 can be communicatively connected to an email protection module referred to as email protector 190.

In the example illustrated in FIG. 1, email protector 190 can be implemented on an appliance or box that is coupled or communicatively connected to an email server operating in an enterprise computer network that is separate and independent of computer network environment 100. In some embodiments, email protector 190 is adapted for obtaining or receiving email activity data 192 from the email server. Email activity data 192 can include information about emails sent to the enterprise computer network and processed by the email server.

In some embodiments, email campaign classifier 170 is adapted for processing, on an ongoing basis, inputs from domain processor 140 (suspicious domains 138) and email protector 190 (email activity data 192) and determining whether a suspicious domain is conducting an email campaign. In some embodiments, email protector 190 can be part of an email campaign detection system, an email fraud system, or email protection system, each or all of which can be part of domain name processing system 180, a domain protection system, or the like.

An email campaign scenario in an example context can be a relatively high number of emails sent to a single recipient (e.g., a customer protected by email protector 190). An email fraud system may detect email campaigns against each small set of email accounts for each individual customer, and alert the customers about any potential issues. A goal here is to improve an email campaign detection/analysis process performed by, for instance, the email fraud system, by reducing both false positive and false negative classification rates.

Email campaigns may come in in various activity patterns—many different sizes and shapes. For example, a lot of the emails can be generated from a page on a person's website for protest, a small scale campaign mounted by one person can send emails repeatedly, and so on. To quantify these observations, significant features associated with a domain, such as whois created date, registrar name, email activity, etc. are extracted and used to prepare a corresponding feature vector with class identity being either "campaign" or "not campaign." Feature vectors for a set of domains thus generated can be used for supervised learning.

Figure 2:
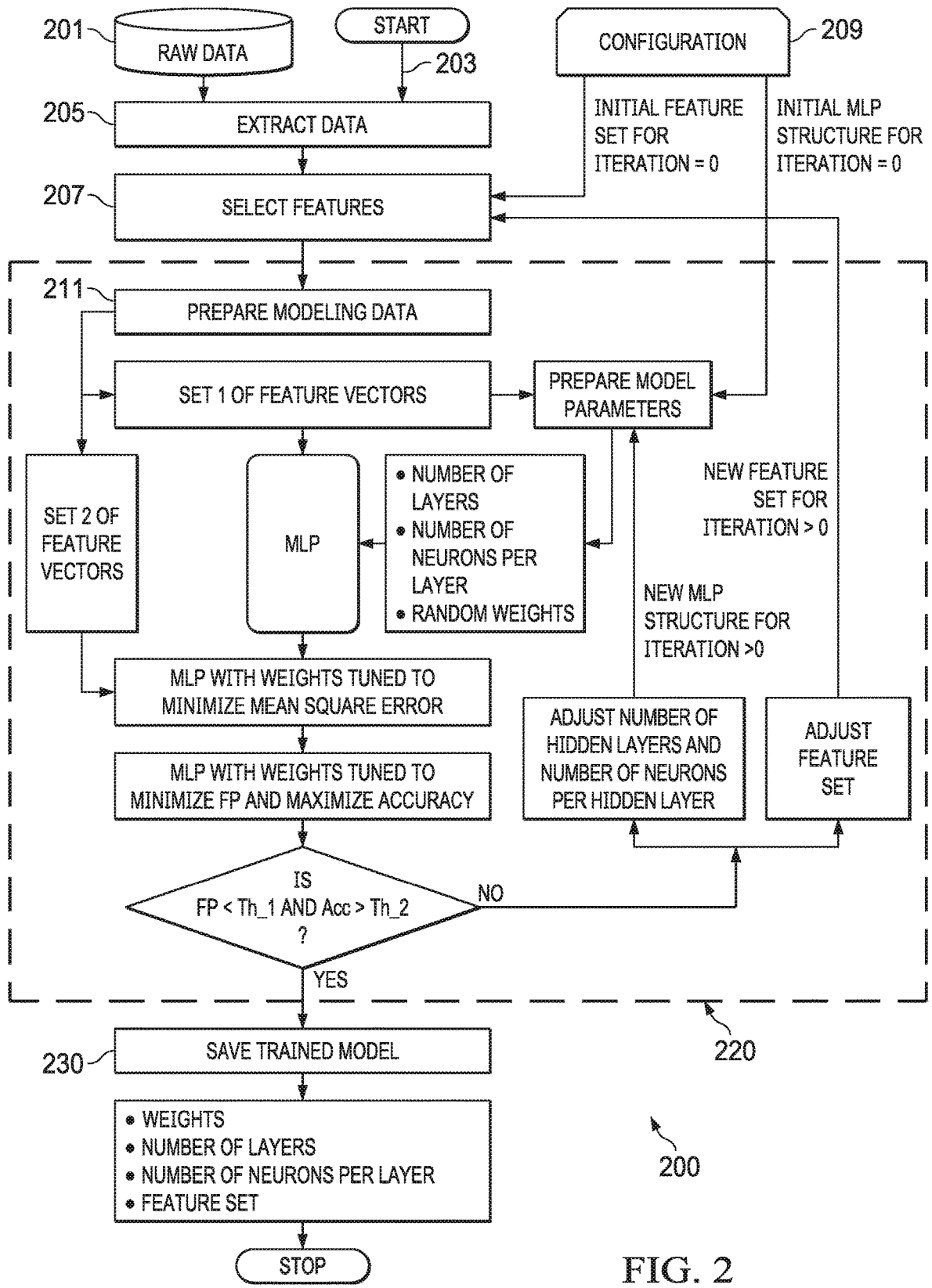
FIG. 2 is a flow diagram that illustrates an example of a process for building and training a machine learning model for email campaign domain classification according to some embodiments disclosed herein.
Figure 3:
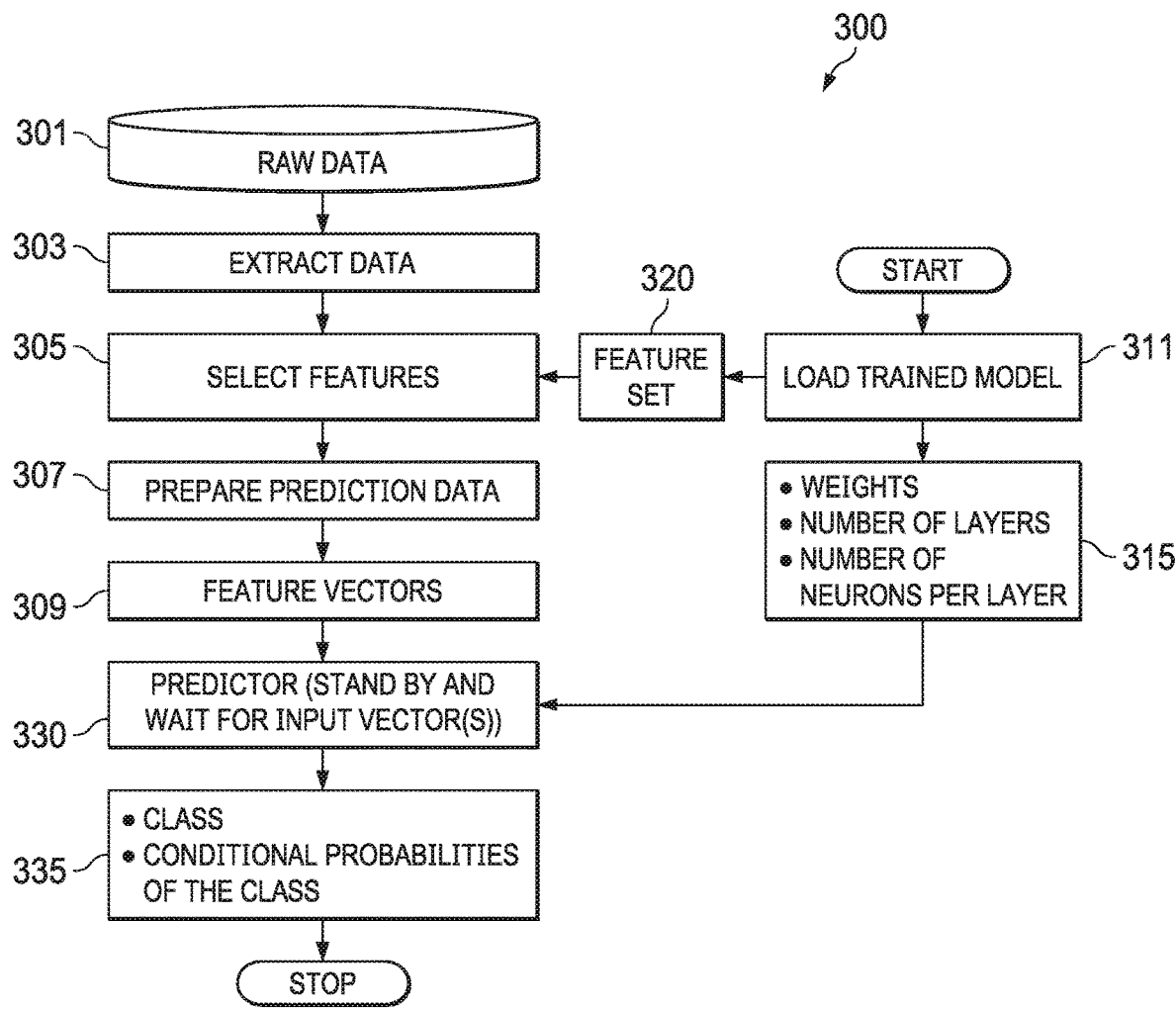
FIG. 3 is a flow diagram that illustrates an example of a process for email campaign domain classification utilizing a trained machine learning model according to some embodiments disclosed herein.

In some embodiments, email campaign classifier 170 employs a machine learning (ML) approach to classify a domain as either "campaign" or "not campaign." The ML approach entails training an Artificial Neural Networks (ANN) based on a set of domains associated with known email campaign activity and not email campaign activity. This process is illustrated in FIG. 2. Once an ANN model is well trained, it can then be used as an email campaign document classifier. This process is illustrated in FIG. 3.

An example of a ML processor implementing this ML approach is first by way of Multilayer Perceptron (MLP) and Backpropagation (BP) algorithm. Next, a local search procedure is applied to optimize the number of hidden layers and the number of neurons per hidden layer. Finally, the similar local search procedure is applied to optimize the feature selection. These techniques are known to those skilled in machine learning and thus are not further described herein.

As illustrated in FIG. 2, process 200 begins with receiving and/or collecting, by a computer system, raw data containing sample domains, each of which is known as either "campaign" or "not campaign" (201). Input domains can include those outputted from a domain processor and/or domain filter(s) described above) (203). Features of each input domain can be extracted using appropriate feature extraction techniques (205). Domain-associated features of interest can be selected from each input domain (207). As a non-limiting example, the initial feature selection of the sample domains can be set in a configuration file leveraging, for instance, domain knowledge (209).

Features can then be reduced by using feature extraction techniques (205). The selected domain features are converted to a feature vector based on domain knowledge (211). The feature vectors for a set of domains are used to train a parametric model, e.g., MLP by using a BP algorithm and local search algorithm (220). Based on minimizing the false positive rate and maximizing the classification accuracy rate of the intermediate trained model (e.g., the trained MLP by BP algorithm) during a verification process, the ANN structure (i.e., the number of layers and the number of neurons per layer) and the feature selection (i.e., a set of features) are iteratively optimized by way of a local search procedure. When the stopping criteria are satisfied, a classification model is built and trained as an email campaign domain classifier and stored (230).

Referring to FIG. 3, in some embodiments, process 300 can involve a standby (trained) email campaign domain classifier and a computer system that receives and/or collects raw data containing domains with unknown class identity (301). Features of each input domain are extracted (303) and selected (305) and feature vectors are created (307) by using the same processing methods during modeling process described above with reference to FIG. 2. If the feature vector of a domain is classified by a trained model disclosed herein as "campaign," it indicates that the domain has an email campaign activity in terms of a conditional probability based on the model learning from training samples. If the feature vector of a domain is classified by a trained model disclosed herein as "not campaign," it indicates that the domain does not have an email campaign activity in terms of a conditional probability based on the model learning from the training samples.

Alternatively, if a domain is classified as indeterminate, this indicates that the domain might not have a good enough indicator as "campaign" or "not campaign." In this case, further investigation of the domain and some action may be required.

Once the classification of an unlabeled domain from the well-trained model is confirmed, as illustrated in FIG. 3, this domain sample with its class identity can be fed back to the data modeling process to improve modeling result for better prediction for a next iteration as illustrated in FIG. 2. For example, the confirmed domain associated feature data can be inserted to the database of raw data in FIG. 2 for modeling next time.

The modeling process shown in FIG. 2 and the classification process shown in FIG. 3 are based on a single base model. To reduce variance and avoid overfitting, a bagging classifier by ensemble meta-algorithms is built in order to reduce variance and avoid overfitting. First, N subsets from the modeling samples are prepared by bootstrapping sampling method. Therefore, there are N learners to form N base classifiers. Then, aggregate the N individual predictions either by averaging or by voting to get a final prediction result. Simply, repeated the modeling process shown in FIG. 2 N times by using N different modeling sample sets, and repeated the prediction process shown in FIG. 3 N times by using N different trained models.

As a non-limiting example, the final selected features can include the following:
domain
seed
match_root
page_title
customer_id
classif
classification_date
created_date
first_detect_date
web_status
under_construction
whois_created_date
match_ratio
efd_check
ip_asn
registrar_name
email_date_array
email_total_array
is_confusable
is_bitsquatting
is_homoglyph
is_transposition
is_vowel_swap
is_repetition
is_qwerty_typo
is_seed_string_present
is_lookalike
root_in_segment
is_addition
is_deletion As a non-limiting example, the final normalized feature vector has the following features:
match_ratio
date_fea
is_chars_in_domain
domain_len
is_before_english_word
before_english_word_len
is_after_english_word
after_english_word_len
seed_len
domain_seed_similarity
asn_fea
under_construction
registrar_name_id
is_bitsquatting
is_homoglyph
is_transposition
is_vowel_swap
is_hyphen_in_dommain
is_qwerty_typo
is_seed_string_present
is_lookalike
root_in_segment
is_addition
is_deletion
eml_fea_-30
eml_fea_-29
eml_fea_-28
eml_fea_-27
eml_fea_-26
eml_fea_-25
eml_fea_-24
eml_fea_-23
eml_fea_-22
eml_fea_-21
eml_fea_-20
eml_fea_-19
eml_fea_-18
eml_fea_-17
eml_fea_-16
eml_fea_-15
eml_fea_-14
eml_fea_-13
eml_fea_-12
eml_fea_-11
eml_fea_-10
eml_fea_-9
eml_fea_-8
eml_fea_-7
eml_fea_-6
eml_fea_-5
eml_fea_-4
eml_fea_-3
eml_fea_-2
eml_fea_-1
eml_fea_0
eml_fea_1
eml_fea_2
eml_fea_3
eml_fea_4
eml_fea_5
eml_fea_6
eml_fea_7
eml_fea_8
eml_fea_9
eml_fea_10 eml_fea_11
eml_fea_12
eml_fea_13
eml_fea_14
eml_fea_15
eml_fea_16
eml_fea_17
eml_fea_18
eml_fea_19
eml_fea_20
eml_fea_21
eml_fea_22
eml_fea_23
eml_fea_24
eml_fea_25
eml_fea_26
eml_fea_27
eml_fea_28
eml_fea_29
eml_fea_30
eml_fea_31
eml_fea_32
eml_fea_33
eml_fea_34
eml_fea_35
eml_fea_36
eml_fea_37
eml_fea_38
eml_fea_39
eml_fea_40
eml_fea_41
eml_fea_42
eml_fea_43
eml_fea_44
eml_fea_45
eml_fea_46
eml_fea_47
eml_fea_48
eml_fea_49
eml_fea_50
eml_fea_51
eml_fea_52
eml_fea_53
eml_fea_54
eml_fea_55
eml_fea_56
eml_fea_57
eml_fea_58
eml_fea_59
eml_fea_60
web_status_fea_0
web_status_fea_1
web_status_fea_2
web_status_fea_3
web_status_fea_4
web_status_fea_5'

These features represent more than email traffic. As exemplified above, some of the features are particular to a suspicious domain relative to a seed domain (e.g., match-ratio, is_before_english_word, before_english_word_len (length), is_after_english_word, domain_seed_similarity, etc.). Additionally, as exemplified above, some of the features relate to the status of the suspicious domain (e.g., under_construction). This may indicate that the domain was registered, but does not have substantive content on its web site. Yet, the domain is used to distribute emails. Further, as exemplified above, some of the features are particular to email activities relative to a domain creation date over a time line (e.g., 30 days prior to "eml_fea_0" and 60 days thereafter).

Together, these features represent a suspicious domain (suspicious as to a seed domain) and its email activities over a range of time. As the email campaign classifier operates on an on-going (e.g., daily) basis, it can monitor and detect whether a suspicious domain is conducting an email campaign based on its learned knowledge about the suspicious domain and its email activities over time.

A prediction/classification engine can be built based on an ML algorithm for a Multilayer Perceptron, which is a class of feedforward ANN. It belongs to supervised learning category because the process is carried out through back-propagation from the training data set can be thought of as a teacher supervising. Backpropagation computes the gradient of the loss function with respect to the weights of the network connections for fitting an ANN. ANN is known to those skilled in the art and thus is not further described herein.

As alluded to above, an objective of the invention is to minimize false positive rate and maximize accurate rate, given modeling samples. To this end, the commonly used loss functions such as mean squared error, cross-entropy, maximum likelihood, etc. may not be sufficiently good to find the optimized solution. Thus, a stage 2 optimization based on local search algorithm is also applied here.

Accordingly, in some embodiments, the modeling samples (e.g., four thousand feature vectors prepared as described above) are divided into training samples and testing samples. The training samples can be consumed by a backpropagation (BP) algorithm for a Multilayer Perceptron. On top of the intermediate training result, the testing samples can be consumed by a local or neighborhood search procedure to iteratively move from one potential weight set to an improved weight set in the neighborhood until some stopping criteria, i.e. when the objective was satisfied. Next, the similar local search procedure can be applied to optimize the number of hidden layers and the number of neurons per each hidden layer. Finally, the similar local search procedure can be applied to optimize the feature selection, which includes the number of neurons in the input layer. In embodiments disclosed herein, the number of neurons in the output layer is equal to the number of distinct class identities, e.g., "campaign" and "not campaign."

As a non-limiting example, a backpropagation ANN is used to optimize neurons weights by fitting training samples in terms of minimizing mean squared error, or other loss functions. Then, a local or neighborhood search procedure is used to optimize neuron weights, the number of hidden layers, and the number of neurons per each hidden layer, and selected features in terms of minimizing false positive rate and maximizing accurate rate. Assume a collection of labeled sample data and each represents an entity associated with a number of attributes can be used to create the corresponding feature vectors. Then, the multi-step modeling algorithm can be applied to build a prediction/classification engine with these feature vectors. Here, the entity is "domain," and the number of attributes are the listed features as described above. Once the verification process is completed, the trained model can be outputted.

Referring to FIGS. 1 and 3, in operation, email campaign classifier 170 loads an email campaign domain classifier (311) and stands by (330). The email campaign domain classifier implements a trained model having optimized neurons weights, a number of layers, and a number of neurons per layer (315), as described above. Meanwhile, a computer system may receive information identifying candidate domains with unknown class identity to investigate (301). This information may come from a separate process (e.g., from a domain filter). The feature extraction techniques are applied to reduce the number of features (303) from raw data, and furthermore only the selected features (305) are used to prepare feature vectors for the input domains (309). The selected feature set (305) has to be the output feature set (320) from the trained model. The feature vectors generated from the candidate domains are input to the trained model which performs the class prediction (330). The output from the trained model includes a predicted class: campaign or not campaign, and, given an input feature vector, the conditional probabilities of both campaign and not campaign (335).

The output from the trained model (which is represented by email campaign classifier 170 in FIG. 1) can be used to update one or more dataset(s) and/or database(s). If the domain is classified as indeterminate, the domain may be added to or included in a dataset of domains requiring further investigation. Additionally or alternatively, the domain may be reported to a customer through a report and/or an alert. An example of a user interface 400 showing a portion of the report is illustrated in FIG. 4.

If the classification of either "campaign" or "not campaign" is confirmed, the domain may be added to an existing database for training to improve a modeling result during a next iteration.

FIG. 5 depicts a diagrammatic representation of a data processing system for implementing a domain processing system. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
  receiving, by a computer system, raw data containing sample domains, each of which has a known class identity, the known class identity indicating whether a domain is conducting an email campaign;
  extracting, by the computer system, features from each of the sample domains;
  selecting, by the computer system, features of interest from the features, the features of interest including at least a feature particular to a seed domain and features particular to email activities over a time line;
  creating, by the computer system, feature vectors from the features of interest;
  training, by the computer system, a machine learning model using the feature vectors, the training including optimizing a neural network structure iteratively until stopping criteria are satisfied, wherein the neural network structure is iteratively optimized using a local search procedure based on minimizing a false positive rate and maximizing a classification accuracy rate of an intermediate trained model during a verification process and wherein when the stopping criteria are met, the machine learning model is built and trained as an email campaign classifier; and
  classifying, by the computer system, candidate domains with unknown class identities utilizing the machine learning model thus trained such that each of the candidate domain is classified as conducting or not conducting an email campaign.

2. The method according to claim 1, wherein the features of interest further include a feature indicating whether a first sample domain of the sample domains is under construction.

3. The method according to claim 2, wherein the features of interest further include a feature indicating a domain creation date of the first sample domain and wherein the time line covers a number of days before the domain creation date of the first sample domain, the domain creation date of the first sample domain, and a number of days after the domain creation date of the first sample domain.

4. The method according to claim 1, further comprising:
  storing the machine learning model thus trained;
  receiving or obtaining the candidate domains with the unknown class identities;
  extracting features from the candidate domains;
  selecting the features of interest from the features extracted from the candidate domains; and
  creating feature vectors from the features of interest selected from the features extracted from the candidate domains.

5. The method according to claim 4, further comprising:
  loading the trained machine learning model; and
  providing the feature vectors created from the features of interest selected from the features extracted from the candidate domains as input to the trained machine learning model, wherein the trained machine learning model outputs a class identity for each respective candidate domain of the candidate domains, the class identity indicating whether the respective candidate domain is conducting an email campaign.

6. The method according to claim 1, wherein the neural network structure includes a number of layers and a number of neurons per layer, wherein the number of layers includes an output layer, and wherein the number of neurons in the output layer is equal to a number of distinct class identities.

7. The method according to claim 6, wherein the number of distinct class identities is two.

8. A domain processing system, comprising:
  a processor;
  a non-transitory computer-readable medium; and
  stored instructions translatable by the processor for:
    receiving raw data containing sample domains, each of which has a known class identity, the known class identity indicating whether a domain is conducting an email campaign;
    extracting features from each of the sample domains;
    selecting features of interest from the features, the features of interest including at least a feature particular to a seed domain and features particular to email activities over a time line;
    creating feature vectors from the features of interest;
    training a machine learning model using the feature vectors, the training including optimizing a neural network structure iteratively until stopping criteria are satisfied, wherein the neural network structure is iteratively optimized using a local search procedure based on minimizing a false positive rate and maximizing a classification accuracy rate of an intermediate trained model during a verification process and wherein when the stopping criteria are met, the machine learning model is built and trained as an email campaign classifier; and
    classifying candidate domains with unknown class identities utilizing the machine learning model thus trained such that each of the candidate domain is classified as conducting or not conducting an email campaign.

9. The domain processing system of claim 8, wherein the features of interest further include a feature indicating whether a first sample domain of the sample domains is under construction.

10. The domain processing system of claim 9, wherein the features of interest further include a feature indicating a domain creation date of the first sample domain and wherein the time line covers a number of days before the domain creation date of the first sample domain, the domain creation date of the first sample domain, and a number of days after the domain creation date of the first sample domain.

11. The domain processing system of claim 8, wherein the stored instructions are further translatable by the processor for:
  storing the machine learning model thus trained;
  receiving or obtaining the candidate domains with the unknown class identities;
  extracting features from the candidate domains;
  selecting the features of interest from the features extracted from the candidate domains; and
  creating feature vectors from the features of interest selected from the features extracted from the candidate domains.

12. The domain processing system of claim 11, wherein the stored instructions are further translatable by the processor for:
  loading the trained machine learning model; and
  providing the feature vectors created from the features of interest selected from the features extracted from the candidate domains as input to the trained machine learning model, wherein the trained machine learning model outputs a class identity for each respective candidate domain of the candidate domains, the class identity indicating whether the respective candidate domain is conducting an email campaign.

13. The domain processing system of claim 8, wherein the neural network structure includes a number of layers and a number of neurons per layer, wherein the number of layers includes an output layer, and wherein the number of neurons in the output layer is equal to a number of distinct class identities.

14. The domain processing system of claim 13, wherein the number of distinct class identities is two.

15. A computer program product comprising a non-transitory computer-readable medium storing instructions translatable by a processor of a domain processing system for:
  receiving raw data containing sample domains, each of which has a known class identity, the known class identity indicating whether a domain is conducting an email campaign;
  extracting features from each of the sample domains;
  selecting features of interest from the features, the features of interest including at least a feature particular to a seed domain and features particular to email activities over a time line;
  creating feature vectors from the features of interest;
  training a machine learning model using the feature vectors, the training including optimizing a neural network structure iteratively until stopping criteria are satisfied, wherein the neural network structure is iteratively optimized using a local search procedure based on minimizing a false positive rate and maximizing a classification accuracy rate of an intermediate trained model during a verification process and wherein when the stopping criteria are met, the machine learning model is built and trained as an email campaign classifier; and classifying candidate domains with unknown class identities utilizing the machine learning model thus trained such that each of the candidate domain is classified as conducting or not conducting an email campaign.

16. The computer program product of claim 15, wherein the features of interest further include a feature indicating whether a first sample domain of the sample domains is under construction.

17. The computer program product of claim 16, wherein the features of interest further include a feature indicating a domain creation date of the first sample domain and wherein the time line covers a number of days before the domain creation date of the first sample domain, the domain creation date of the first sample domain, and a number of days after the domain creation date of the first sample domain.

18. The computer program product of claim 15, wherein the instructions are further translatable by the processor for:
   storing the machine learning model thus trained;
   receiving or obtaining the candidate domains with the unknown class identities;
   extracting features from the candidate domains;
   selecting the features of interest from the features extracted from the candidate domains; and
   creating feature vectors from the features of interest selected from the features extracted from the candidate domains.

* * * * *